(12) United States Patent
Yamasaki

(10) Patent No.: US 8,675,121 B2
(45) Date of Patent: Mar. 18, 2014

(54) CAMERA AND CAMERA SYSTEM

(75) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 13/063,839

(22) PCT Filed: Oct. 14, 2009

(86) PCT No.: PCT/JP2009/068087
§ 371 (c)(1),
(2), (4) Date: Mar. 14, 2011

(87) PCT Pub. No.: WO2010/050386
PCT Pub. Date: May 6, 2010

(65) Prior Publication Data
US 2011/0164169 A1    Jul. 7, 2011

(30) Foreign Application Priority Data
Oct. 30, 2008    (JP) .................................. 2008-280275

(51) Int. Cl.
*H04N 5/232*    (2006.01)
*G03B 13/00*    (2006.01)

(52) U.S. Cl.
USPC ........................................... 348/345; 396/79

(58) Field of Classification Search
USPC .......................................... 348/345; 396/79
See application file for complete search history.

(56) References Cited

U.S. PATENT DOCUMENTS

| 5,373,342 | A  | 12/1994 | Utagawa |
| 7,474,352 | B2 | 1/2009  | Oikawa  |
| 2001/0036361 | A1 | 11/2001 | Suda |
| 2006/0045507 | A1 | 3/2006 | Takamiya |
| 2007/0206940 | A1* | 9/2007 | Kusaka ........................ 396/128 |

FOREIGN PATENT DOCUMENTS

| EP | 1936955 A2 | 6/2008 |
| EP | 1986045 A2 | 10/2008 |
| JP | 52-138924 A | 11/1977 |
| JP | 60-014211 A | 1/1985 |
| JP | 63-172110 A | 7/1988 |
| JP | 03-214133 A | 9/1991 |

(Continued)

OTHER PUBLICATIONS

Extended European Search Report dated Nov. 26, 2012, in European Patent Application No. 09823498.2.

(Continued)

*Primary Examiner* — Anthony J Daniels
(74) *Attorney, Agent, or Firm* — Fitzpatrick, Cella, Harper & Scinto

(57) ABSTRACT

A camera comprising at least a second focus detection unit out of a first focus detection unit which includes a first pupil-dividing unit for guiding light beams having passed through different pupil regions of a photographing lens and detects a focus of the photographing lens by using light beams guided by the first pupil-dividing unit, and the second focus detection unit which includes a second pupil-dividing unit different from the first pupil-dividing unit and detects the focus of the photographing lens on an image plane different from an image plane by the first focus detection unit by using light beams guided by the second pupil-dividing unit, wherein focus detection of the photographing lens by the second focus detection unit is performed using a correction value for focus detection that is stored in advance in the photographing lens in correspondence with the first focus detection unit.

12 Claims, 11 Drawing Sheets

(56) References Cited

FOREIGN PATENT DOCUMENTS

| | | |
|---|---|---|
| JP | 05-127074 A | 5/1993 |
| JP | 08-054560 A | 2/1996 |
| JP | 2000-156823 A | 6/2000 |
| JP | 2003-029135 A | 1/2003 |
| JP | 2003-250080 A | 9/2003 |
| JP | 2004-191629 A | 7/2004 |
| JP | 2005-062459 A | 3/2005 |
| JP | 2007-121896 A | 5/2007 |
| JP | 2007-189312 A | 7/2007 |
| JP | 2008-040084 A | 2/2008 |
| JP | 2008-083456 A | 4/2008 |
| JP | 2008-152012 A | 7/2008 |
| WO | 2008/032820 A1 | 3/2008 |

OTHER PUBLICATIONS

Office Action dated Sep. 26, 2012, in Korean Patent Application No. 10-2011-7011969.

* cited by examiner

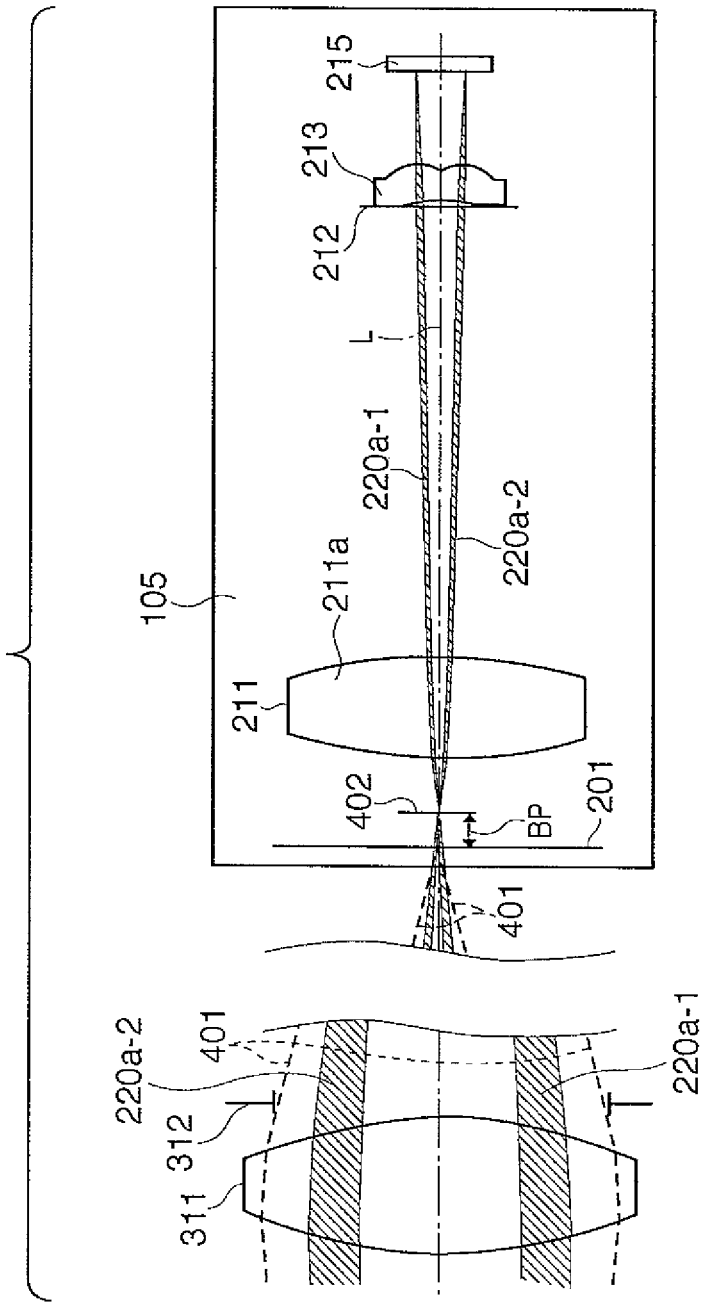

FIG. 6A

| | | ZOOM POSITION | | | | | | | |
|---|---|---|---|---|---|---|---|---|---|
| | | 1 | 2 | 3 | 4 | 5 | 6 | 7 | 8 |
| FOCUS POSITION | 1 | BP111 | BP112 | BP113 | BP114 | BP115 | BP116 | BP117 | BP118 |
| | 2 | BP121 | BP122 | BP123 | BP124 | BP125 | BP126 | BP127 | BP128 |
| | 3 | BP131 | BP132 | BP133 | BP134 | BP135 | BP136 | BP137 | BP138 |
| | 4 | BP141 | BP142 | BP143 | BP144 | BP145 | BP146 | BP147 | BP148 |
| | 5 | BP151 | BP152 | BP153 | BP154 | BP155 | BP156 | BP157 | BP158 |
| | 6 | BP161 | BP162 | BP163 | BP164 | BP165 | BP166 | BP167 | BP168 |
| | 7 | BP171 | BP172 | BP173 | BP174 | BP175 | BP176 | BP177 | BP178 |
| | 8 | BP181 | BP182 | BP183 | BP184 | BP185 | BP186 | BP187 | BP188 |

FIG. 6B

| | | ZOOM POSITION | | | | | | | |
|---|---|---|---|---|---|---|---|---|---|
| | | 1 | 2 | 3 | 4 | 5 | 6 | 7 | 8 |
| FOCUS POSITION | 1 | BP211 | BP212 | BP213 | BP214 | BP215 | BP216 | BP217 | BP218 |
| | 2 | BP221 | BP222 | BP223 | BP224 | BP225 | BP226 | BP227 | BP228 |
| | 3 | BP231 | BP232 | BP233 | BP234 | BP235 | BP236 | BP237 | BP238 |
| | 4 | BP241 | BP242 | BP243 | BP244 | BP245 | BP246 | BP247 | BP248 |
| | 5 | BP251 | BP252 | BP253 | BP254 | BP255 | BP256 | BP257 | BP258 |
| | 6 | BP261 | BP262 | BP263 | BP264 | BP265 | BP266 | BP267 | BP268 |
| | 7 | BP271 | BP272 | BP273 | BP274 | BP275 | BP276 | BP277 | BP278 |
| | 8 | BP281 | BP282 | BP283 | BP284 | BP285 | BP286 | BP287 | BP288 |

FIG. 6C

| | | ZOOM POSITION | | | | | | | |
|---|---|---|---|---|---|---|---|---|---|
| | | 1 | 2 | 3 | 4 | 5 | 6 | 7 | 8 |
| FOCUS POSITION | 1 | BP311 | BP312 | BP313 | BP314 | BP315 | BP316 | BP317 | BP318 |
| | 2 | BP321 | BP322 | BP323 | BP324 | BP325 | BP326 | BP327 | BP328 |
| | 3 | BP331 | BP332 | BP333 | BP334 | BP335 | BP336 | BP337 | BP338 |
| | 4 | BP341 | BP342 | BP343 | BP344 | BP345 | BP346 | BP347 | BP348 |
| | 5 | BP351 | BP352 | BP353 | BP354 | BP355 | BP356 | BP357 | BP358 |
| | 6 | BP361 | BP362 | BP363 | BP364 | BP365 | BP366 | BP367 | BP368 |
| | 7 | BP371 | BP372 | BP373 | BP374 | BP375 | BP376 | BP377 | BP378 |
| | 8 | BP381 | BP382 | BP383 | BP384 | BP385 | BP386 | BP387 | BP388 |

FIG. 11
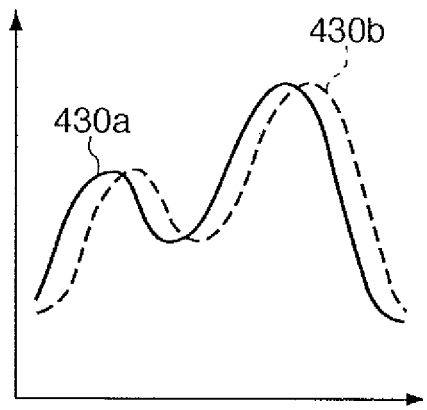
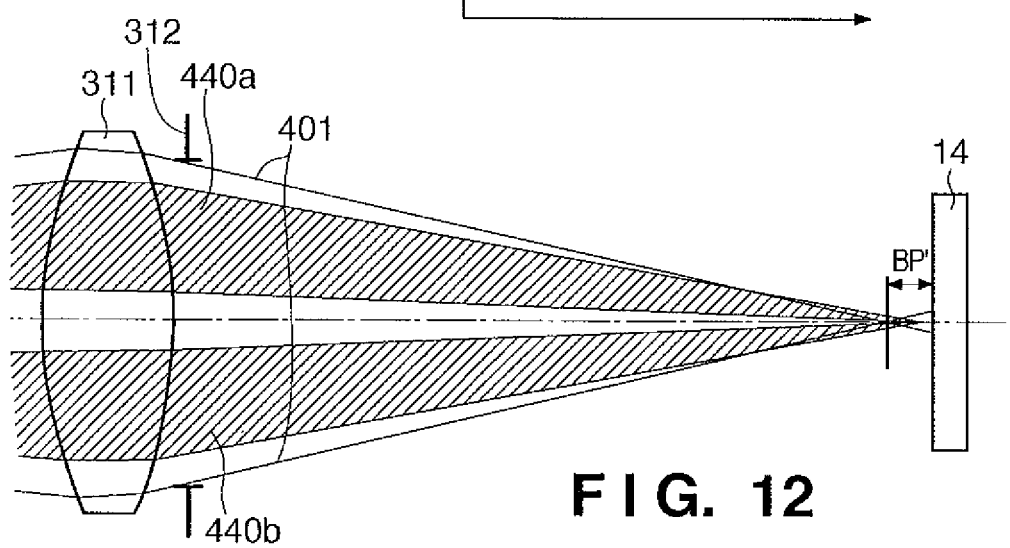
FIG. 12
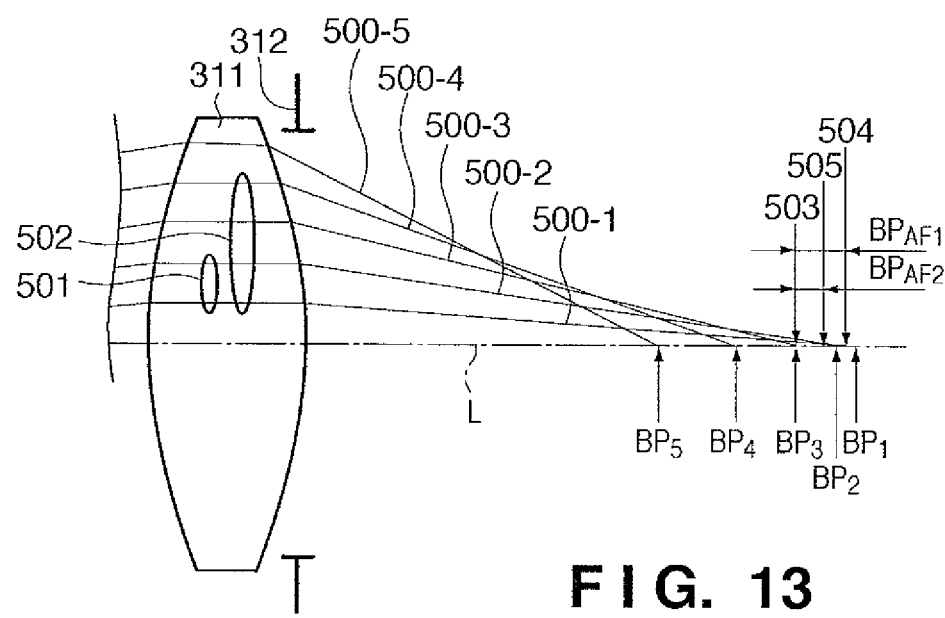
FIG. 13

CAMERA AND CAMERA SYSTEM

TECHNICAL FIELD

The present invention relates to a technique of adjusting the focus of the photographing lens of a digital still camera, video camera, or the like.

BACKGROUND ART

General methods of detecting and adjusting the focus of a camera using a light beam having passed through a photographing lens are a contrast detection method and phase-difference detection method. The contrast detection method is popular in video cameras and digital still cameras, and uses an image sensor as a focus detection sensor. This method pays attention to a signal output from the image sensor, especially information (contrast information) of a high-frequency component. A photographing lens position where the evaluation value of the contrast information maximizes is set as an in-focus position. However, the contrast detection method, also called a hill-climbing detection method, is not suitable for a high-speed focus detection operation. This is because the evaluation value is obtained while slightly moving the focus position of the photographing lens. The focus position needs to be moved until it is found out that the evaluation value was maximum.

Focus detection by the phase-difference detection method is adopted in many single-lens reflex cameras. This technique is most contributed to practical use of AF (Auto Focus) single-lens reflex cameras. The AF in the phase-difference detection method is generally achieved by a focus detection means formed from a secondary imaging optical system. The focus detection means includes a pupil-dividing means for splitting a light beam having passed through the exit pupil of the photographing lens into two regions. The two split light beams are respectively received by paired focus detection sensors via the secondary imaging optical system. The defocus amount of the photographing lens is directly obtained by detecting the shift amount between signals output in accordance with the light receiving amounts, i.e., a relative positional error in the pupil-dividing direction. Once the focus detection sensor executes an accumulation operation, the defocus amount and direction can be attained at once. This enables a high-speed focus adjustment operation.

According to this focus detection method, a photographing light beam guided to the image sensor and a focus detection light beam guided to the focus detection means out of a light beam having passed through the photographing lens differ from each other. Owing to aberrations (e.g., spherical aberration) of the photographing lens, optimum image plane positions do not match each other. It is known to store in advance the difference between optimum image plane positions arising from the difference between light beams, and correct a focus detection result in focus detection. In a camera system including a single-lens reflex camera and a plurality of photographing lenses interchangeably mounted on the camera, each photographing lens generally stores in advance a correction value corresponding to the difference between optimum image plane positions. In focus detection, the photographing lens sends the correction value to the camera, implementing high-precision focus detection. Thus, the difference between optimum image plane positions can be appropriately corrected regardless of a photographing lens mounted on the camera. For example, Japanese Patent Laid-Open No. 63-172110 discloses this technique.

There is also proposed a technique of adding a phase-difference detection AF function to an image sensor. This technique achieves high-speed AF while the user confirms an image in real time on a display means such as a rear liquid crystal display. For example, in Japanese Patent Laid-Open No. 2000-156823, a pupil-dividing function is added to some light receiving elements (pixels) of an image sensor by decentering the sensitive regions of light receiving portions from the optical axis of an on-chip microlens. These pixels are used as focus detection pixels and arranged between image sensing pixels at predetermined intervals to perform phase-difference focus detection. No image sensing pixel exists at a portion where a focus detection pixel is arranged. Image information at this portion is generated by interpolation using information of peripheral image sensing pixels. In this example, phase-difference focus detection can be done on the image sensing plane, achieving high-speed, high-precision focus detection.

Recently, it is examined to add the phase-difference detection AF function of the image sensor to a camera with phase-difference detection AF using the secondary imaging optical system. This camera can execute phase-difference AF by using the secondary imaging optical system in an object observation state via an optical viewfinder and by using the image sensor in an object observation state via a display means such as a rear liquid crystal display. High-speed AF can be done in the two observation states using the optical and electronic viewfinders.

However, this camera suffers the following problem. In phase-difference AF using the image sensor, similar to phase-difference AF using the secondary imaging optical system, a focus is basically detected using light beams having passed through two different regions out of a light beam having passed through the exit pupil of the photographing lens. Since the photographing light beam and focus detection light beam differ from each other, the camera requires a correction value corresponding to the difference between optimum image plane positions. According to phase-difference AF using the secondary imaging optical system, the photographing lens stores in advance a correction value corresponding to the difference between optimum image plane positions, so the camera can execute high-precision AF. To the contrary, phase-difference AF using the image sensor does not consider a correction value corresponding to the difference between optimum image plane positions, and the camera cannot perform high-precision AF.

As a measure, a correction value based on an optimum image plane position may be prepared in advance in phase-difference AF using the image sensor. However, in a camera system in which the camera allows interchanging a plurality of photographing lenses, especially a photographing lens released in the past does not hold a correction value corresponding to the difference between optimum image plane positions. It is necessary to store a correction value in the camera for each photographing lens and ensure a large storage area at high cost.

DISCLOSURE OF INVENTION

The present invention detects the focus at high precision in both phase-difference AF using a secondary imaging optical system and phase-difference AF using an image sensor in a camera and camera system.

According to the present invention, there is provided a camera comprising at least second focus detection means out of first focus detection means which includes first pupil-dividing means for guiding light beams having passed through different pupil regions of a photographing lens and detects a focus of the photographing lens by using light beams guided by the first pupil-dividing means, and the second focus detection means which includes second pupil-dividing means different from the first pupil-dividing means and detects the focus of the photographing lens on an image plane different from an image plane by the first focus detection means by using light beams guided by the second pupil-dividing means, wherein focus detection of the photographing lens by the second focus detection means is performed using a correction value for focus detection that is stored in advance in the photographing lens in correspondence with the first focus detection means.

Further features of the present invention will become apparent from the following description of exemplary embodiments with reference to the attached drawings.

BRIEF DESCRIPTION OF DRAWINGS

FIG. 5 is an optical sectional view showing a focus detection optical system formed from the focus detection device that is unfolded straight by omitting a sub-mirror;

FIG. 6A is a table showing actual correction values for focus detection stored in a nonvolatile memory;

FIG. 6B is a table showing actual correction values for focus detection stored in the nonvolatile memory;

FIG. 6C is a table showing actual correction values for focus detection stored in the nonvolatile memory;

FIG. 11 is a graph showing a pair of focus detection signals which are generated by a composition unit and coupling unit and sent to an AF unit;

FIG. 12 is an optical sectional view of a lens and image sensor in FIG. 1 when viewed from an optical viewfinder;

FIG. 13 is a schematic view showing aberration of the lens;

BEST MODE FOR CARRYING OUT THE INVENTION

Embodiments of the present invention will now be described in detail with reference to the accompanying drawings.

(First Embodiment)

Figure 1:
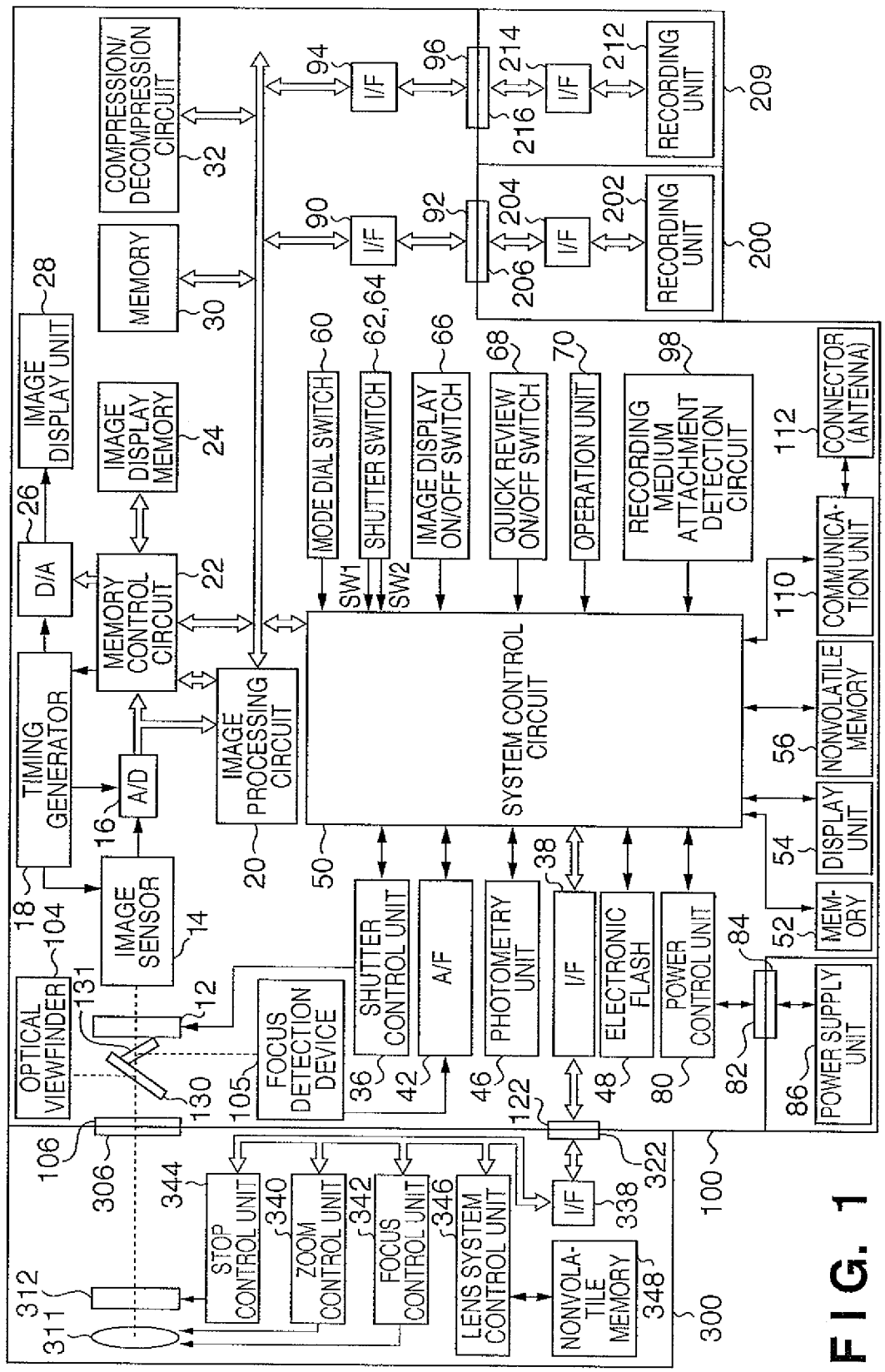
FIG. 1 is a block diagram showing the arrangement of a camera system including a camera and photographing lens according to the first embodiment of the present invention.

FIG. 1 is a block diagram showing the arrangement of a camera system including a camera capable of interchanging a plurality of photographing lenses, and a photographing lens for the camera in the first embodiment of the present invention.

Referring to FIG. 1, the camera system in the first embodiment includes a camera 100 and a photographing lens 300 interchangeably mounted on the camera 100. The camera 100 will be explained first.

The camera 100 copes with a camera system using a plurality of types of photographing lenses 300. Lenses of the same type with different serial numbers can be mounted. Photographing lenses 300 with different focal lengths or minimum F-numbers or with a zoom function can also be mounted. The camera 100 enables interchanging photographing lenses regardless of whether they are of the same type or different types.

In the camera 100, a light beam traveling from the photographing lens 300 passes through a camera mount 106 and is reflected up by a main mirror 130, entering an optical viewfinder 104. The optical viewfinder 104 allows the user to take a picture while observing an object as an optical image. The optical viewfinder 104 displays some functions of a display unit 54, e.g., focusing, camera shake warning, flash charge, shutter speed, F-number, and exposure compensation.

The main mirror 130 is formed from a semi-transparent half mirror. Part of a light beam incident on the main mirror 130 passes through the half mirror and is reflected down by a sub-mirror 131, entering a focus detection device 105. The focus detection device 105 includes a first pupil-dividing unit. The detailed arrangement of the focus detection device 105 will be described later. The focus detection device 105 converts a formed optical image into an electrical signal, and sends the signal to an AF unit 42.

The AF unit 42 executes focus detection calculation using the electrical signal. Based on the obtained calculation result, a system control circuit 50 controls a focus control unit 342 of the photographing lens 300 to perform focus adjustment processing and the like. The detailed arrangement of the focus detection device 105 will be described later.

When performing a photographing operation after the end of focus adjustment processing of the photographing lens 300, a quick return mechanism (not shown) retracts the main mirror 130 and sub-mirror 131 from the optical path of a photographing light beam. A light beam having passed through the photographing lens 300 enters, via a shutter 12 for controlling an exposure, an image sensor 14 to convert an optical image into an electrical signal. After the end of the photographing operation, the main mirror 130 and sub-mirror 131 return to positions as shown in FIG. 1.

The image sensor 14 sends the converted electrical signal to an A/D converter 16, and the A/D converter 16 converts the analog signal output into a digital signal (image data). A timing generator 18 supplies clock signals and control signals to the image sensor 14, the A/D converter 16, and a D/A converter 26. A memory control circuit 22 and the system control circuit 50 control the timing generator 18.

An image processing circuit 20 executes predetermined pixel interpolation processing and color conversion processing for image data from the A/D converter 16 or the memory control circuit 22. The image processing circuit 20 also performs predetermined calculation processing using image data.

The image sensor 14 includes a second focus detection unit. The image processing circuit 20 converts image data corresponding to the second focus detection unit out of obtained image data into image data for focus detection. The image processing circuit 20 sends the image data for focus detection to the AF unit 42 via the system control circuit 50, adjusting the focus of the photographing lens 300, similar to the first focus detection unit. The detailed arrangement of the second focus detection unit will be explained later.

The system control circuit 50 can also execute so-called contrast focus detection. More specifically, the system control circuit 50 performs focus adjustment processing for the focus control unit 342 of the photographing lens 300 based on the calculation result of calculating image data of the image sensor 14 by the image processing circuit 20.

The memory control circuit 22 controls the A/D converter 16, the timing generator 18, the image processing circuit 20, an image display memory 24, the D/A converter 26, a memory 30, and a compression/decompression circuit 32. Data from the A/D converter 16 is written in the image display memory 24 or memory 30 via the image processing circuit 20 and memory control circuit 22 or directly via the memory control circuit 22.

An image display unit 28 is formed from a liquid crystal monitor or the like. Display image data written in the image display memory 24 is displayed on the image display unit 28 via the D/A converter 26. An electronic viewfinder function can be provided by sequentially displaying captured image data on the image display unit 28. The image display unit 28 can arbitrarily turn on/off its display in accordance with an instruction from the system control circuit 50. In a display OFF state, power consumption of the camera 100 can be greatly reduced.

In the electronic viewfinder mode, similar to the photographing operation, the quick return mechanism (not shown) retracts the main mirror 130 and sub-mirror 131 from the optical path of a photographing light beam. At this time, the focus detection device 105, i.e., first focus detection unit cannot detect the focus. Instead, the second focus detection unit of the image sensor 14 detects the focus. This enables detecting the focus of the photographing lens 300 in both the optical viewfinder mode and electronic viewfinder mode. In the electronic viewfinder mode, contrast focus detection is possible.

The memory 30 stores captured still images and moving images and has a memory capacity enough to store a predetermined number of still images or moving images for a predetermined time. Many images can therefore be written in the memory 30 at high speed even in sequential shooting for continuously capturing a plurality of still images, or panoramic shooting. The memory 30 is also available as the work area of the system control circuit 50.

The compression/decompression circuit 32 has a function of compressing/decompressing image data by adaptive discrete cosine transform (ADCT) or the like. The compression/decompression circuit 32 reads out an image from the memory 30, compresses or decompresses it, and writes the processed image data in the memory 30.

A shutter control unit 36 controls the shutter 12 in cooperation with a stop control unit 344 which controls a stop 312 of the photographing lens 300 based on photometry information from a photometry unit 46.

An interface 38 and connector 122 electrically connect the camera 100 and photographing lens 300. The interface 38 and connector 122 also have a function of communicating control signals, status signals, data signals, and the like between the camera 100 and the photographing lens 300, and supplying currents of various voltages. The interface 38 and connector 122 may communicate not only by telecommunication but also by optical communication or speech communication.

The photometry unit 46 executes AE processing. The photometry unit 46 can measure the exposure state of an image when a light beam having passed through the photographing lens 30Q enters the photometry unit 46 via the camera mount 106, the main mirror 130, and a photometry lens (not shown). The photometry unit 46 also has an EF processing function in cooperation with an electronic flash 48. The system control circuit 50 can perform AE control for the shutter control unit 36 and the stop control unit 344 of the photographing lens 300, based on the calculation result of image data of the image sensor 14 by the image processing circuit 20.

The electronic flash 48 has an AF auxiliary light projecting function and an electronic flash control function.

The system control circuit 50 controls the overall camera 100. A memory 52 stores constants, variables, and programs for the operation of the system control circuit 50.

The display unit 54 is a liquid crystal display device which displays operation states, messages, and the like using a text, image, sound, and the like in accordance with a program executed by the system control circuit 50. The display unit 54 is arranged at one or a plurality of visible positions near the operation unit of the camera 100. The display unit 54 is formed from a combination of an LCD and LED or the like.

Display contents on the LCD among those of the display unit 54 are information on shooting counts (e.g., recorded count and recordable count), and information on shooting conditions (e.g., shutter speed, F-number, exposure compensation, and electronic flash). In addition, the LCD displays the battery level and date & time. As described above, some functions of the display unit 54 are indicated in the optical viewfinder 104.

A nonvolatile memory 56 is an electrically erasable/programmable memory such as an EEPROM.

Operation units 60, 62, 64, 66, 68, and 70 are used to input various kinds of operation instructions to the system control circuit 50. Each operation unit is formed from a single component or a combination of components such as a switch, dial, touch panel, pointing by line-of-sight detection, and speech recognition device.

The mode dial switch 60 can switch a function mode between a power-off mode, an automatic shooting mode, a manual shooting mode, a panoramic shooting mode, a macro shooting mode, a playback mode, a multiwindow playback/erase mode, and a PC-connected mode.

The shutter switch SW1 62 is turned on by pressing a shutter button (not shown) halfway, and designates the start of an operation such as AF processing, AE processing, AWB processing, or EF processing.

The shutter switch SW2 64 is turned on by pressing the shutter button (not shown) completely, and designates the start of a series of shooting-related processing operations. The shooting-related processing includes exposure, development, and recording. In the exposure processing, a signal read out from the image sensor 14 is written in the memory 30 via the A/D converter 16 and memory control circuit 22. In the development processing, development is done using calculation by the image processing circuit 20 or memory control circuit 22. In the recording processing, image data is read out from the memory 30, compressed by the compression/decompression circuit 32, and written in a recording medium 200 or 209.

The image display ON/OFF switch 66 can set the ON/OFF state of the image display unit 28. When the user takes a picture using the optical viewfinder 104, supply of a current to the image display unit formed from a liquid crystal monitor or the like can be stopped by the function of the image display ON/OFF switch 66, thereby saving power.

The quick review ON/OFF switch 68 sets a quick review function of automatically playing back image data obtained immediately after shooting.

The operation unit 70 is formed from a variety of buttons, a touch panel, and the like. These buttons include a menu button, electronic flash setting button, single shooting/continuous shooting/self timer switching button, selection move button, shooting quality selection button, exposure compensation button, and date/time setting button.

A power control unit 80 includes a battery detection circuit, DC/DC converter, and switching circuit to switch a block to be energized. The power control unit 80 detects loading/unloading of a battery, battery type, and battery level. Based on the detection result and an instruction from the system control circuit 50, the power control unit 80 controls the DC/DC converter to supply a necessary voltage to the units including a recording medium for a necessary period.

Connectors 82 and 84 connect the camera 100 and a power supply unit 86 formed from a primary cell (e.g., an alkaline cell or lithium cell), a secondary cell (e.g., an NiCd cell, NIMH cell, or Li ion cell), or an AC adapter.

Interfaces 90 and 94 have a function of connecting a recording medium such as a memory card or hard disk. Connectors 92 and 96 physically connect a recording medium such as a memory card or hard disk. A recording medium attachment detection unit 98 detects whether a recording medium is connected to the connector 92 or 96.

In the embodiment, there are two systems of interfaces and connectors to connect a recording medium. The interfaces and connectors to connect a recording medium can have either one or a plurality of systems. Interfaces and connectors of different standards may also be combined. Interfaces and connectors compliant with the standards of a PCMCIA card, CF (CompactFlash®) card, and the like are usable.

By connecting various kinds of communication cards such as a LAN card and modem card to the interfaces and connectors, the camera can exchange image data and management information accessory to the image data with another peripheral device such as a computer or printer.

A communication unit 110 has various communication functions such as RS232C, USB, IEEE1394, P1284, SCSI, modem, LAN, and wireless communication.

A connector 112 connects the camera 100 to another device via the communication unit 110. For wireless communication, the connector 112 is an antenna.

Examples of the recording media 200 and 209 are a memory card and hard disk. The recording media 200 and 209 include recording units 202 and 212 each formed from a semiconductor memory, magnetic disk, or the like, interfaces 204 and 214 with the camera 100, and connectors 206 and 216 for connecting the recording media 200 and 209 to the camera 100.

Next, the photographing lens 300 will be explained.

The photographing lens 300 is detachable from the camera 100.

A lens mount 306 mechanically connects the photographing lens 300 to the camera 100. The lens mount 306 is interchangeably attached to the camera 100 via the camera mount 106. The camera mount 106 and lens mount 306 include the functions of the connector 122 and a connector 322 for electrically connecting the photographing lens 300 to the camera 100.

A lens 311 includes a focus lens for adjusting the focus on an object. The stop 312 controls the quantity of photographing light beam.

The connector 322 and an interface 338 electrically connect the photographing lens 300 to the connector 122 of the camera 100. The connector 322 also has a function of communicating control signals, status signals, data signals, and the like between the camera 100 and the photographing lens 300, and supplying currents of various voltages. The connector 322 may communicate not only by telecommunication but also by optical communication or speech communication.

A zoom control unit 340 controls zooming of the lens 311. The focus control unit 342 controls the focus lens operation of the lens 311. If the photographing lens 300 is a single-focus lens having no zoom function, the zoom control unit 340 may be omitted.

The stop control unit 344 controls the stop 312 in cooperation with the shutter control unit 36 for controlling the shutter 12 based on photometry information from the photometry unit 46.

A lens system control unit 346 controls the whole photographing lens 300. The lens system control unit 346 has a memory function of storing constants, variables, and programs for the operation of the photographing lens.

A nonvolatile memory 348 stores identification information (e.g., photographing lens-specific number), management information, function information (e.g., minimum F-number, maximum F-number, and focal length), and current and past setting values. In the embodiment, the nonvolatile memory 348 also stores a correction value for focus detection to correct the optimum image plane position of the photographing lens 300 in focus detection by the focus detection device 105, i.e., first focus detection unit.

A plurality of correction values for focus detection are prepared in accordance with focus positions and zoom positions of the lens 311. When performing focus detection using the first focus detection unit in the camera 100, a correction value optimum for focus detection is selected in correspondence with the focus position and zoom position of the lens 311.

As described in Description of the Related Art, a photographing light beam traveling from the photographing lens 300 and a focus detection light beam used by the first focus detection unit differ from each other. Owing to aberrations of the photographing lens 300, an optimum image plane position by the first focus detection unit and that of the photographing light beam shift from each other. The correction value for focus detection is used to correct this shift. Photographing lenses with different focal lengths, minimum F-numbers, zoom functions, i.e., different optical arrangements have different correction values for focus detection. Photographing lenses of the same type with different serial numbers sometimes have different correction values for focus detection in association with a manufacturing error.

The configuration of the camera system including the camera 100 and photographing lens 300 in the embodiment has been described.

The focus detection device 105 serving as the first focus detection unit in the first embodiment will be described in detail.

Figure 2:
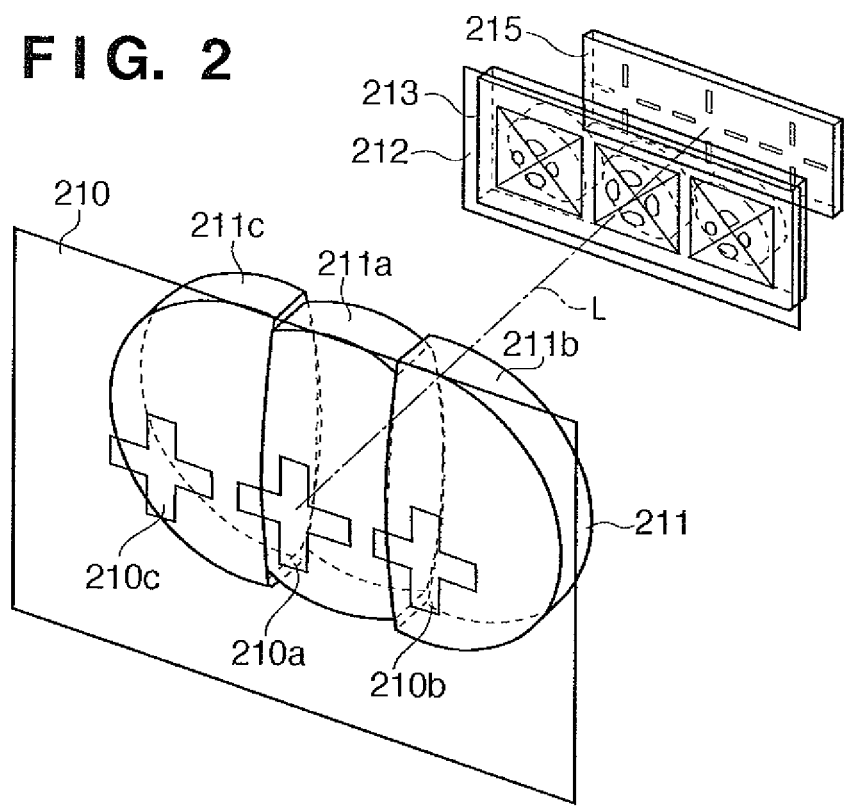
FIG. 2 is a perspective view showing the arrangement of a focus detection device.

FIG. 2 is a perspective view showing the arrangement of the focus detection device 105 in the first embodiment. The focus detection device 105 adopts phase-difference focus detection using a secondary imaging optical system. An actual focus detection device is made compact by deflecting the optical path by a reflecting mirror or the like. However, FIG. 2 shows a focus detection device unfolded straight for illustrative convenience.

In FIG. 2, an optical axis L coincides with the optical axis of the photographing lens 300. A field mask 210 has cross-shaped apertures 210a, 210b, and 210c at the center, right, and left. The field mask 210 is arranged near a position equivalent to the prospective imaging plane of the photographing lens 300, i.e., the imaging plane of the image sensor 14 via the sub-mirror 131. A field lens 211 is arranged behind the field mask 210. The field lens 211 is made up of a plurality of lens portions 211a, 211b, and 211c having different optical actions. The lens portions have different lens optical axes. The lens portions 211a, 211b, and 211c correspond to the apertures 210a, 210b, and 210c of the field mask 210, respectively.

A stop 212 has a plurality of apertures. A secondary imaging lens unit (imaging lens unit) 213 includes lens portions corresponding to the respective apertures of the stop 212. The secondary imaging lens unit 213 forms again, on the light receiving element array of a light receiving element 215 arranged behind, an object image formed on the prospective imaging plane by the field lens 211. An infrared cut filter (not shown) is arranged immediately in front of the stop 212 to cut an infrared wavelength component unnecessary for focus detection.

The stop 212 has two pairs of apertures at each of the center, right, and left, i.e., a total of six pairs=12 apertures.

Flat prisms are formed on the incident surface side of the secondary imaging lens unit 213 in correspondence with the stop apertures. Similar to the stop 212, a total of six pairs=12 flat prisms are formed. On the exit surface side, lens portions having spherical or aspherical surfaces are formed in correspondence with the prisms. Similarly, a total of six pairs=12 lens portions are formed.

The light receiving element 215 includes light receiving element arrays corresponding to the respective lens portions. Similarly, a total of six pairs=12 light receiving element arrays are formed.

In the arrangement of the focus detection device 105, a light beam having passed through, e.g., the aperture 210a of the field mask passes through the lens portion 211a and then two pairs of stop apertures at the center, splitting the light beam into four. The four light beams enter two pairs of prisms at the center of the secondary imaging lens unit 213, and emerge from two pairs of lens units, forming two pairs of aperture images corresponding to the aperture 210a of the field mask 210 on two pairs of light receiving element arrays of the light receiving element 215.

As is well known, as the focus of the photographing lens 300 changes, optical images within paired aperture images move close to or apart from each other. A light amount distribution regarding the optical image is sent as an electrical signal to the AF unit 42 based on outputs from the light receiving element arrays.

Figure 3:
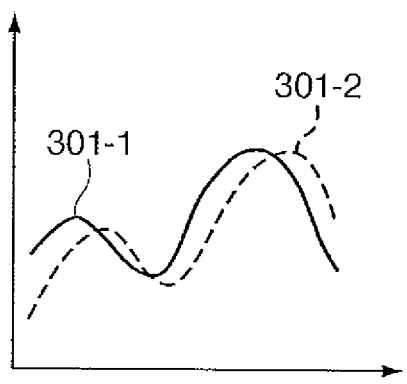
FIG. 3 is a graph showing a pair of focus detection signals generated by a pair of light receiving element arrays of a light receiving element.

FIG. 3 is a graph showing a pair of focus detection signals generated by a pair of light receiving element arrays of the light receiving element 215. In FIG. 3, the abscissa axis represents the pixel position of the light receiving element array, and the ordinate axis represents the strength of an output signal. Solid and dotted lines indicate a pair of focus detection signals 301-1 and 301-2. The focus detection signals 301-1 and 301-2 represent a state in which the photographing lens 300 defocuses. The focus detection signal 301-1 exhibits a left lateral shift, and the focus detection signal 301-2 indicates a right one. This shift amount is detected by a well-known correlation calculation unit or the like, obtaining the defocus amount and direction of the photographing lens 300.

The AF unit 42 has a function of detecting the shift amount. Paired focus detection signal shift amounts corresponding to the current focus position of the photographing lens 300 are calculated using a well-known correlation calculation unit. In contrast, paired focus detection signal shift amounts in the in-focus state of the photographing lens 300 are stored in advance in the nonvolatile memory 56 during the manufacture of the camera 100. Hence, paired focus detection signal shift amounts at the current focus position relative to those in the in-focus state can be detected, attaining the defocus amount and direction of the photographing lens 300. The photographing lens 300 is instructed about the defocus amount and direction to adjust the focus.

Although only portions with the suffix a have been described, this also applies to portions with the suffixes b and c.

Figure 4:
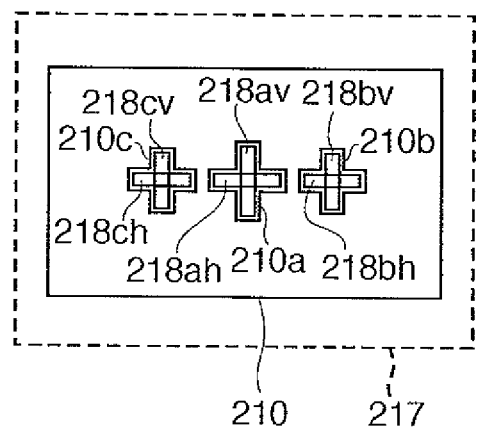
FIG. 4 is a view showing the respective light receiving element arrays of the light receiving element that are projected back on a field mask.

FIG. 4 is a view showing the respective light receiving element arrays of the light receiving element 215 that are projected back on the field mask 210. The field mask is arranged at a position optically equivalent to the light receiving surface of the image sensor 14, so FIG. 4 can be regarded to show the light receiving surface of the image sensor 14. Referring to FIG. 4, a rectangle 217 indicated by a dotted line, which is larger in size than the field mask 210, represents a photographing range where the pixels of the image sensor 14 are formed. Back-projected images 218ah, 218bh, 218ch, 218av, 218bv, and 218cv of light receiving element arrays for detecting vertical and horizontal lines are formed within the three field mask apertures. The back-projected image itself is a focus detection region for performing focus detection of an object, i.e., a so-called cross-shaped focus detection region. According to the first embodiment, cross-shaped focus detection regions are arranged at the center, right, and left, i.e., a total of three portions in the photographing range 217, as shown in FIG. 4.

FIG. 5 is an optical sectional view showing a focus detection optical system formed from the focus detection device 105 in FIG. 2 that is unfolded straight by omitting the sub-mirror 131. The optical path is partially cut and shortened to show the focus detection optical system so that it is entirely fit within the sheet surface.

In FIG. 5, a light beam 401 indicated by a dotted line is a photographing light beam which passes through the lens 311 and stop 312 of the photographing lens 300 and forms an image at the center of the image sensor 14, i.e., the intersection of the optical axis L of the photographing lens and a field mask 201. The light receiving surface of the image sensor 14 is arranged at the same position as that of the field mask 201, and the image sensor 14 is not illustrated.

The focus detection device 105 serving as the first focus detection unit is arranged behind the field mask 201 (light receiving surface of the image sensor 14). The lens portion 211a of the field lens 211 has an optical power to image representative exit pupil positions of various kinds of photographing lenses 300 and the stop 212. In the first embodiment, the stop 312 is assumed to be positioned at the exit pupil of the photographing lens 300. Then, the field lens 211 projects the images of paired apertures of the stop 212 on the surface of the stop 312. Paired focus detection light beams 220a-1 and 220a-2 indicated by hatched portions in FIG. 5 are formed by the stop 212 having paired apertures and the secondary imaging lens unit having paired plan prisms and paired lens portions. The light beam is split into two on the stop 312. That is, the light receiving element 215 receives the paired focus detection light beams 220a-1 and 220a-2 obtained by pupil division of the photographing lens 300.

In this case, the field lens 211 and stop 212 serve as the first pupil-dividing unit. The focus detection device 105 in the first embodiment includes both the first pupil-dividing unit and first focus detection unit.

Phase-difference focus detection is implemented by guiding a pair of light beams split on the exit pupil of the photographing lens 300 to the focus detection device 105.

The paired focus detection light beams 220a-1 and 220a-2 form images not on the field mask 201 (light receiving surface of the image sensor 14) but on a surface 402 behind the field mask 201. To the contrary, the photographing light beam 401 forms an image on the field mask 201. This is because a photographing light beam and focus detection light beam differ from each other and optimum image plane positions shift from each other. In FIG. 5, BP represents the shift, which serves as a correction value stored for focus detection in the nonvolatile memory 348 of the photographing lens 300. FIG. 5 shows a state in which the correction value BP for focus detection is reflected correctly after focus detection by the focus detection device 105. The photographing light beam 401 forms an image on the field mask 201 (light receiving surface of the image sensor 14).

The shift between optimum image plane positions arises not only from the difference between light beams but also from the difference between the spectral characteristics of light beams received by the image sensor 14 and light receiving element 215 and the difference between spatial frequencies of interest. In the embodiment, the correction value BP for focus detection considers all these differences.

Note that FIG. 5 is directed to the focus detection region 218av in the back-projected image of the light receiving element array in FIG. 4. The focus detection region 218ah perpendicular to the focus detection region 218av has the same optical arrangement and also causes the same phenomenon. The off-axis focus detection regions 218bh, 218ch, 218bv, and 218cv also have the same basic optical arrangement, a detailed description of which will not be repeated. Thus, the focus detection regions 218bh, 218ch, 218bv, and 218cv suffer a shift as shown in FIG. 5 and require the correction value BP for focus detection.

FIGS. 6A, 6B, and 6C show actual correction values stored in the nonvolatile memory 348 for focus detection. FIG. 6A shows correction values for focus detection that correspond to the focus detection regions 218ah and 218av in FIG. 4. FIG. 6B shows correction values for focus detection that correspond to the focus detection regions 218bh and 218bv in FIG. 4. FIG. 6C shows correction values for focus detection that correspond to the focus detection regions 218ch and 218cv in FIG. 4. The focus detection regions are optically axially symmetrical about the optical axis L. Aberration of the photographing lens 300 is the same, so three correction values for focus detection are shared between six focus detection regions.

Referring to FIG. 6A, the embodiment sets eight zoom positions and eight focus positions for the photographing lens 300. Correction values BP111 to BP188 for focus detection are set at the respective positions. This enables higher-precision correction in accordance with the zoom position and focus position of the photographing lens 300. This also applies to FIGS. 6B and 6C.

With this arrangement, the focus detection device 105 serving as the first focus detection unit can detect the focus of the photographing lens 300 at high precision.

The detailed arrangement of the image sensor 14 functioning as the second focus detection unit in the first embodiment will be explained.

Figure 7:
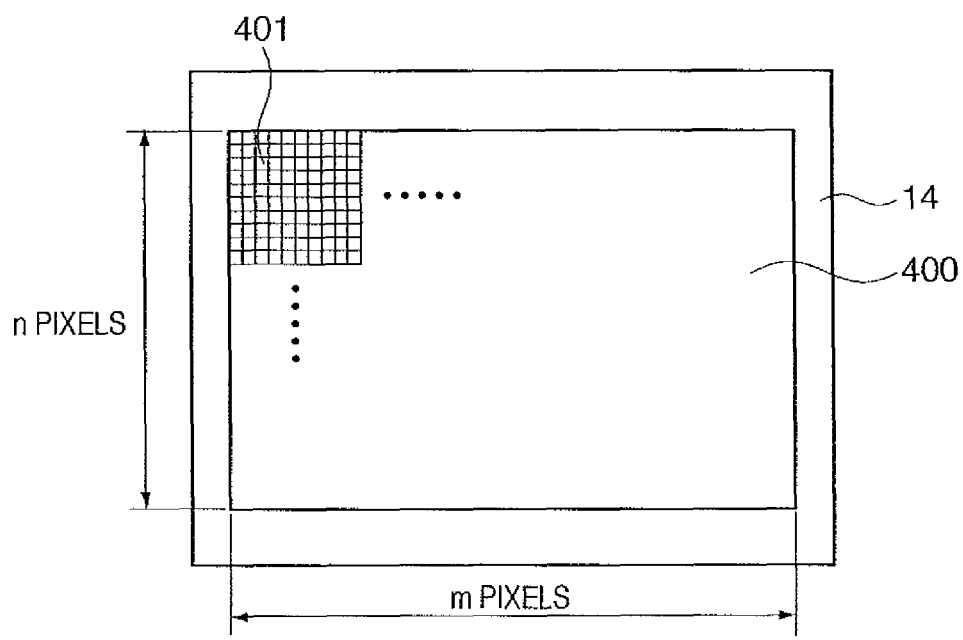
FIG. 7 is a plan view of light receiving pixels of an image sensor on which an optical image is formed, when viewed from the photographing lens.

FIG. 7 is a plan view of light receiving pixels of the image sensor 14 on which an object image is formed, when viewed from the photographing lens 300 in the block diagram of the camera system of FIG. 1. A photographing range 400 on the image sensor 14 is made up of m×n pixels in the lateral and longitudinal directions. A pixel portion 401 is part of the photographing range 400. Each pixel portion has on-chip primary color filters of a Bayer array, and the primary color filters are arranged in a cycle of 2×2=4 pixels. FIG. 7 shows only 10×10 upper left pixels as a pixel portion for illustrative convenience, and does not illustrate the remaining pixel portions.

Figures 8A, 8B:
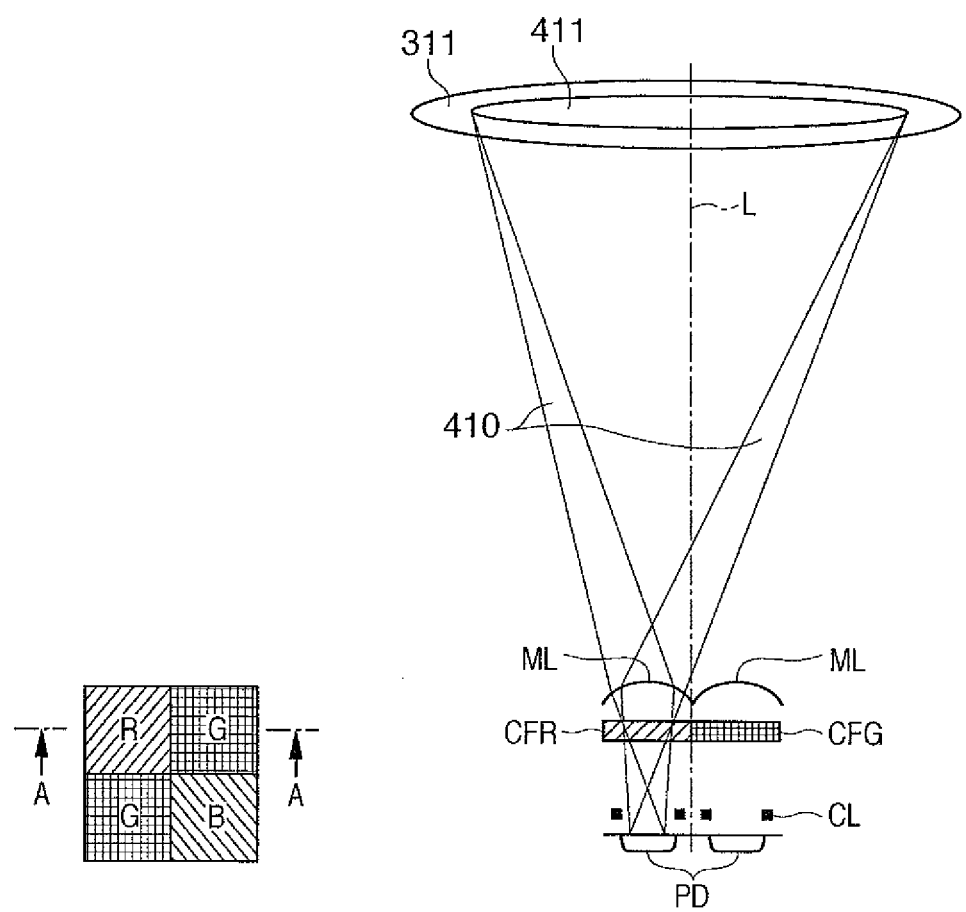
FIGS. 8A and 8B are a plan view and sectional view, respectively, for explaining the layout of image sensing pixels.
Figure 9A:
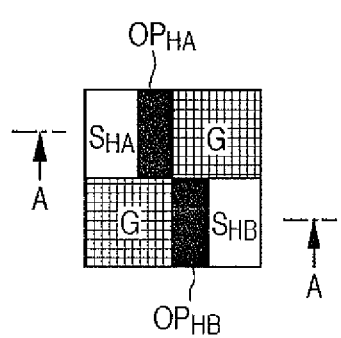
FIGS. 9A and 9B are a plan view and sectional view, respectively, for explaining the layout of focus detection pixels.
Figure 9B:
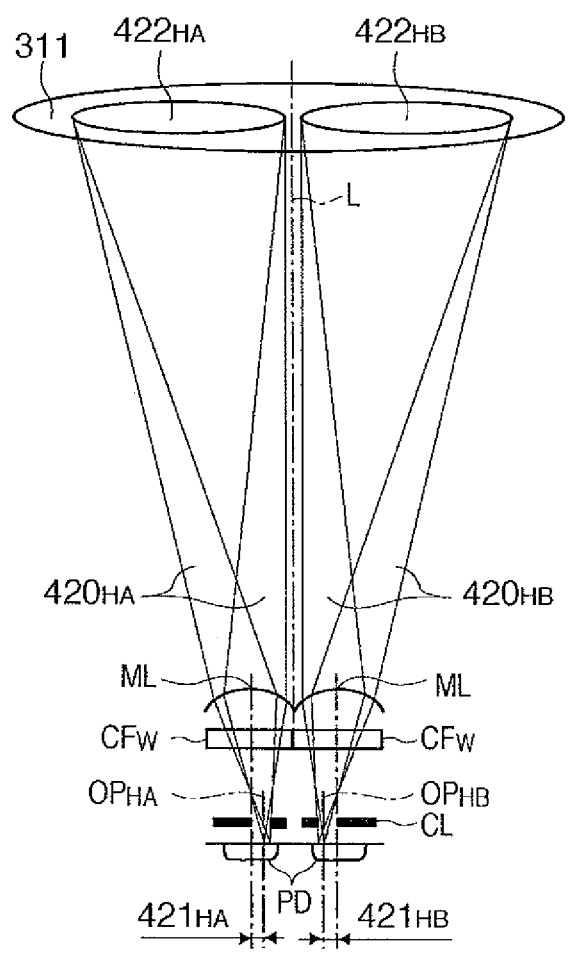

FIGS. 8A, 8B, 9A, and 9B are views for explaining the structures of an image sensing pixel and focus detection pixel at the pixel portion in FIG. 7. FIGS. 8B and 9B are optical sectional views of the lens 311 and image sensor 14 in FIG. 1 when viewed from the optical viewfinder 104. Members unnecessary for description are not illustrated. The first embodiment adopts a Bayer array in which two pixels having G (Green) spectral sensitivity are diagonally arranged among 2×2=4 pixels, and pixels each having R (Red) or B (Blue) spectral sensitivity are arranged as the two remaining pixels. Focus detection pixels with a structure to be described later are interposed between the Bayer arrays.

FIGS. 8A and 8B show the arrangement and structure of image sensing pixels. FIG. 8A is a plan view of 2×2 image sensing pixels. As is generally known, G pixels are diagonally arranged in the Bayer array, and R and B pixels are arranged as the two remaining pixels. This 2×2 structure is repetitively arranged.

FIG. 8B is a sectional view taken along the line A-A in FIG. 8A. Reference symbol ML denotes an on-chip microlens arranged in front of each pixel; $CF_R$, an R (Red) color filter; and $CF_G$, a G (Green) color filter. Reference symbol PD (Photo Diode) denotes a schematic photoelectric converter of a C-MOS image sensor. Reference symbol CL (Contact Layer) denotes an interconnection layer for forming a signal line for transmitting various signals within the C-MOS image sensor. FIGS. 8A and 8B are views showing the structure of pixels near the center in the image sensor 14, i.e., near the axis of the photographing lens 300.

The on-chip microlens ML and photoelectric converter PD of the image sensing pixel are configured to capture a light beam having passed through the photographing lens 300 as effectively as possible. In other words, an exit pupil Exit Pupil of the photographing lens 300 and the photoelectric converter PD are conjugate to each other via the microlens ML, and the effective area of the photoelectric converter is designed large. A light beam 410 in FIGS. 8A and 8B shows this state. The entire region of an exit pupil 411 is captured by the photoelectric converter PD. As described above, the stop 312 is positioned at the exit pupil of the photographing lens 300 in the embodiment. The exit pupil 411 therefore corresponds to the aperture of the stop 312. FIGS. 8A and 8B show a light beam incident on the R pixel, but the G pixel and B (Blue) pixel also have the same structure. Members around the microlens ML are enlarged for easy understanding, but are actually in micron order.

FIGS. 9A and 9B show the arrangement and structure of focus detection pixels for dividing the pupil of the photographing lens 300 in the horizontal direction (lateral direction). The horizontal direction is defined as the longitudinal direction of the image sensor 14 shown in FIG. 7. FIG. 9A is a plan view of 2×2 pixels including focus detection pixels.

When obtaining an image signal for recording or viewing, G pixels acquire the main component of luminance information. The image recognition feature of a man is sensitive to luminance information. If G pixels are omitted, degradation of the image quality is readily perceived. R or B pixels acquire color information (color difference information). The human visual characteristics are not sensitive to color information. Hence, even if some pixels for acquiring color information are omitted, degradation of the image quality is hardly recognized. From this, in the embodiment, G pixels out of 2×2 pixels are left as image sensing pixels, and R and B pixels are replaced with focus detection pixels. In FIG. 9A, $S_{HA}$ and $S_{HB}$ represent focus detection pixels.

FIG. 9B is a sectional view taken along the line A-A in FIG. 9A. The microlens ML and photoelectric converter PD have the same structures as those of the image sensing pixel shown in FIG. 8B. FIGS. 9A and 9B are views showing the structure of pixels near the center in the image sensor 14, i.e., near the axis of the photographing lens 300.

In the embodiment, a signal from the focus detection pixel is not used to generate an image, so a transparent film $CF_W$ (White) is arranged in place of a color filter for color separation. To divide the exit pupil 411 by the image sensor, the aperture of the interconnection layer CL is decentered in one direction from the center line of the microlens ML. More specifically, an aperture $OP_{HA}$ of the pixel $S_{HA}$ is decentered to the right by $421_{HA}$ from the center line of the microlens ML. The aperture $OP_{HA}$ receives a light beam $420_{HA}$ having passed through an exit pupil region $422_{HA}$ on the left side with respect to the optical axis L of the lens 311. Similarly, an aperture $OP_{HB}$ of the pixel $S_{HE}$ is decentered to the left by $421_{HB}$ from the center line of the microlens ML. The aperture $OP_{HB}$ receives a light beam $420_{HB}$ having passed through an exit pupil region $422_{HB}$ on the right side with respect to the optical axis L of the lens 311. As is apparent from FIGS. 9A and 9B, the decentering amount $421_{HA}$ equals the decentering amount $421_{HB}$. By decentering the microlens ML and aperture OP, light beams 420 having passed through different pupil regions of the photographing lens 300 can be extracted. The microlens ML and aperture OP will be called the second pupil-dividing unit.

In this arrangement, a plurality of pixels $S_{HA}$ are arrayed in the horizontal direction, and an object image acquired by these pixels is defined as image A. Pixels $S_{HB}$ are also arrayed in the horizontal direction, and an object image acquired by these pixels is defined as image B. By detecting the relative positions of images A and B, the defocus amount of the object image can be detected. Hence, the image sensor 14 functions as the second focus detection unit and also has the second pupil-dividing unit.

Note that FIGS. 9A and 9B show focus detection pixels near the center of the image sensor 14. At portions other than the center, the microlens ML and the apertures $OP_{HA}$ and $OP_{HB}$ of the interconnection layer CL are decentered differently from that in FIG. 9B, thereby dividing the exit pupil 411. The aperture $OP_{HA}$ will be exemplified. The aperture $OP_{HA}$ is decentered so that the spherical core of the almost spherical microlens ML coincides with a line connecting the centers of the aperture $OP_{HA}$ and exit pupil 411. Even at the periphery of the image sensor 14, almost the same pupil division as that by focus detection pixels near the center shown in FIGS. 9A and 9B can be achieved, a detailed description of which will be omitted.

The pixels $S_{HA}$ and $S_{HB}$ enable focus detection for an object, e.g., a longitudinal line having a luminance distribution in the lateral direction of the photographing frame, but cannot do it for a lateral line having a luminance distribution in the longitudinal direction. To detect a lateral line, pixels are arranged to divide the pupil even in the vertical direction (longitudinal direction) of the photographing lens. The first embodiment employs a pixel structure for focus detection in only the lateral direction, as described with reference to FIGS. 8A, 8B, 9A, 9B, and 10.

The focus detection pixel does not hold original color information. When forming a captured image, a signal is generated by interpolation calculation using pixel signals from the periphery. Focus detection pixels are arranged not successively but discretely on the image sensor 14. This layout does not degrade the quality of a captured image. The second focus detection unit can detect the focus in a wider region of the photographing range 400 than a focus detection range by the first focus detection unit described with reference to FIG. 4. However, the first embodiment sets focus detection regions by the second focus detection unit at almost the same three portions as those by the first focus detection unit shown in FIG. 4. More specifically, focus detection regions by the second focus detection unit spread in only the lateral direction of the image sensor 14. The focus detection regions 218ah, 218bh, and 218ch serve as focus detection regions by the second focus detection unit.

As described with reference to FIGS. 7 to 9B, the image sensor 14 has both the image sensing function and the functions of the second pupil-dividing unit and second focus detection unit.

Figure 10:
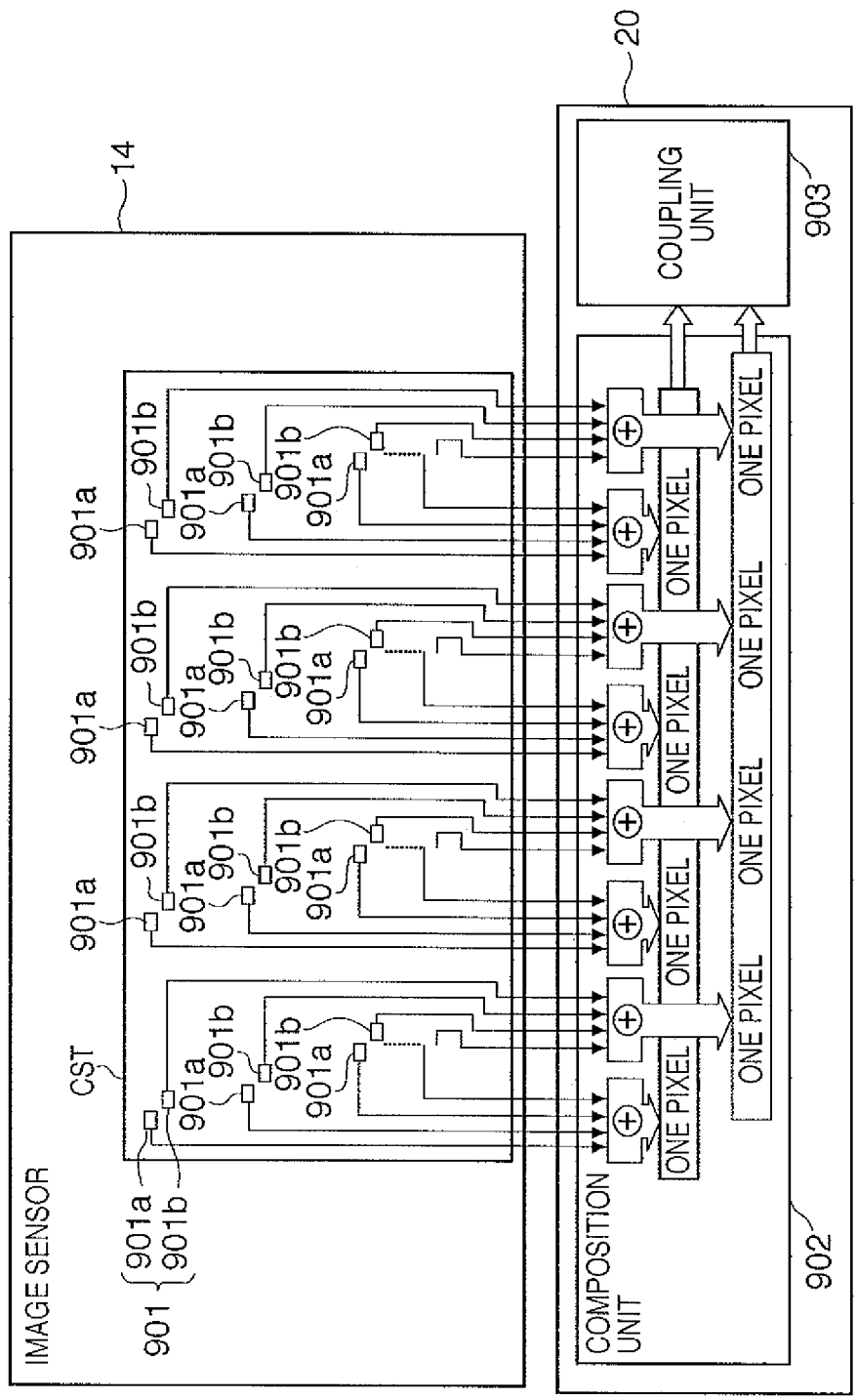
FIG. 10 is a circuit diagram schematically showing the focus detection arrangement of the image sensor and image processing unit.

FIG. 10 is a circuit diagram schematically showing the focus detection arrangement of the image sensor 14 and image processing circuit 20 serving as the second focus detection unit. In a description of the block diagram of the camera system in FIG. 1, image data obtained by the image sensor 14 is sent to the image processing circuit 20 via the A/D converter 16. For descriptive convenience, FIG. 10 does not illustrate the A/D converter 16.

The image sensor 14 includes a plurality of focus detection portions 901 each made up of pupil-divided focus detection pixels 901a and 901b. The focus detection portion 901 corresponds to FIG. 9A. The focus detection pixel 901a corresponds to the pixel $S_{HA}$, and the focus detection pixel 901b corresponds to the pixel $S_{HB}$. The image sensor 14 includes a plurality of image sensing pixels for photoelectrically converting an object image formed by the photographing lens.

The image processing circuit 20 includes a composition unit 902 and coupling unit 903. The image processing circuit 20 assigns a plurality of sections (regions) CST to the image sensing surface of the image sensor 14 to contain a plurality of focus detection portions 901. The image processing circuit 20 can appropriately change the size, arrangement, number, and the like of sections CST. The composition unit 902 composites signals output from the focus detection pixels 901a in each of the sections CST assigned to the image sensor 14, obtaining the first composite signal of one pixel. The composition unit 902 also composites signals output from the focus detection pixels 901b in each section CST, obtaining the second composite signal of one pixel. The coupling unit 903 couples the first composite signals of pixels in the sections CST, attaining the first coupled signal. The coupling unit 903 also couples the second composite signals, attaining the second coupled signal. A coupled signal obtained by coupling as many pixels as the sections is attained for each of the focus detection pixels 901a and focus detection pixels 901b. In this way, signals output from focus detection pixels arranged in each section in the same pupil-dividing directions are composited. Even if luminance corresponding to each focus detection portion is low, the luminance distribution of an object can be satisfactorily detected.

FIG. 11 shows a pair of focus detection signals which are generated by the focus detection portion 901, composition unit 902, and coupling unit 903 in FIG. 10 and sent to the AF unit 42. In FIG. 11, the abscissa axis represents the pixel arrangement direction of a coupled signal, and the ordinate axis represent the signal strength. A focus detection signal 430a is generated by the focus detection pixel 901a, and a focus detection signal 430b is generated by the focus detection pixel 901b. Since the photographing lens 300 is defocused on the image sensor 14, the focus detection signal 430a shifts to the left, and the focus detection signal 430b shifts to the right.

The AF unit 42 calculates the shift amount between the focus detection signals 430a and 430b by well-known correlation calculation or the like. The shift amounts exhibits the defocus amount of the photographing lens 300, and the focus can be adjusted. The focus detection calculation by the AF unit 42 is the same as that by the first focus detection unit.

FIG. 12 is an optical sectional view of the lens 311 and image sensor 14 in the block diagram of the camera system of FIG. 1 when viewed from the optical viewfinder 104. FIG. 12 shows a photographing light beam and focus detection light beam which form images at the center of the image sensor 14. Members unnecessary for description except for the lens 311 and image sensor 14 are not illustrated.

Referring to FIG. 12, the light beam 401 indicated by a solid line is a photographing light beam which passes through the lens 311 and stop 312 of the photographing lens 300 and forms an image near the center of the light receiving surface of the image sensor 14. Paired light beams 440a and 440b indicated by hatched portions in FIG. 12 are focus detection light beams which form images near the center of the light receiving surface of the image sensor 14, out of focus detection light beams respectively received by the focus detection pixels 901a and 901b in FIG. 10.

Similar to the first focus detection unit, the second focus detection unit suffers a shift in optimum image plane position between the focus detection light beams 440a and 440b and the photographing light beam 401 due to the difference between the light beams. FIG. 12 shows a state in which the second focus detection unit adjusts the focus of the photographing lens 300. In this case, the photographing light beam 401 forms a near-focus image with respect to the image sensor 14 owing to lens aberration. In FIG. 12, BP' represents this shift amount. Even if the second focus detection unit adjusts the focus of the photographing lens 300, the photographing lens 300 is still out of focus by BP'. The first embodiment solves this problem by applying a correction value prepared in advance for focus detection by the first focus detection unit.

FIG. 13 is a schematic view showing aberration of the lens 311 for explaining application of a correction value for focus detection. The lens aberration is axially symmetrical, so FIG. 13 shows only light beams passing through the upper side with respect to the optical axis L. The stop 312 is set at a minimum F-number. In FIG. 13, light beams 500-1, 500-2, 500-3, 500-4, and 500-5 are emitted from one object point (not shown) on the optical axis L, and have their imaging positions shifted from each other owing to spherical aberration of the lens 311. More specifically, the light beam 500-1 forms an image at a position $BP_1$, the light beam 500-2 forms one at a position $BP_2$, the light beam 500-3 forms one at a position $BP_3$, the light beam 500-4 forms one at a position $BP_4$, and the light beam 500-5 forms one at a position $BP_5$.

The optimum image plane position of a photographing light beam will be examined. When the optimum image plane position is considered to be the average position of the imaging positions $BP_1$ to $BP_5$, a position indicated by an arrow 503, i.e., the imaging position $BP_3$ is the optimum image plane position. An optimum image plane position by the first focus detection unit will be examined. The first focus detection unit uses a light beam passing through a pupil 501 shown in FIG. 13. The light beams 500-1 and 500-2 pass through the pupil 501, so the optimum image plane position is indicated by an arrow 504 between $BP_1$ and $BP_2$. Finally, an optimum image plane position by the second focus detection unit will be examined. The second focus detection unit uses a light beam passing through a pupil 502 in FIG. 13. The light beams 500-1 to 500-4 pass through the pupil 502, and thus the optimum image plane position is indicated by an arrow 505 between $BP_2$ and $BP_3$. That is, a correction value for focus detection by the first focus detection unit is $BP_{AF1}$, and that by the second focus detection unit is $BP_{AF2}$.

According to a simple model considering only spherical aberration of the simple lens 311, the optimum image plane position of the second focus detection unit shifts from that of a photographing light beam in the same direction as that of the optimum image plane position of the first focus detection unit. This shift amount is smaller than that for the first focus detection unit. This is because a focus detection light beam on the exit pupil of the lens 311 is wider for the second focus detection unit than for the first focus detection unit and closer to a photographing light beam. By storing a magnification coefficient K corresponding to the correction value $BP_{AF1}$ for focus detection in the camera 100 in advance, the correction value $BP_{AF2}$ for focus detection can be calculated by $$BP_{AF2}=BP_{AF1}\times K \quad (1)$$

Actual aberration of the photographing lens 300 is not only spherical aberration but includes a variety of aberrations, and is more complicated. However, high-precision focus detection can be done by calculating the magnification coefficient K based on equation (1). FIG. 13 shows a light beam which forms an image on the optical axis L. Even for a light beam which forms an image off the axis, the magnification coefficient K can be calculated according to equation (1) though the amount and direction of aberration are different.

In practice, the magnification coefficient K is prepared for each value in the focus detection correction value tables shown in FIGS. 6A and 6B. The second focus detection unit can implement high-precision focus detection regardless of the zoom position and focus position of the photographing lens 300.

The magnification coefficient K may be a fixed value instead of preparing it for each value in the focus detection correction value tables in FIGS. 6A and 6B, as long as the correlation with the correction value $BP_{AF1}$ for focus detection is obtained in advance by optical simulation or the like. This setting can greatly reduce the memory area of the non-volatile memory 56 or the like in the camera 100.

Focus detection regions by the second focus detection unit substantially coincide with the focus detection regions 218ah, 218bh, and 218ch by the focus detection unit in FIG. 4. Thus, prepared magnification coefficients K comply with the correction values for focus detection that correspond to the focus detection regions 218ah, 218bh, and 218ch by the first focus detection unit, i.e., the correction values for focus detection in FIGS. 6A and 6B.

In this example, only spherical aberration of the lens 311 has been explained schematically. In practice, the amount and direction of spherical aberration are more complex. The magnitudes and directions of the correction values $BP_{AF1}$ and $BP_{AF2}$ for focus detection may differ from those in FIG. 13. The magnitudes and directions of the correction values $BP_{AF1}$ and $BP_{AF2}$ for focus detection are finally calculated by optical simulation, measurement in the process, or the like.

Figure 14:
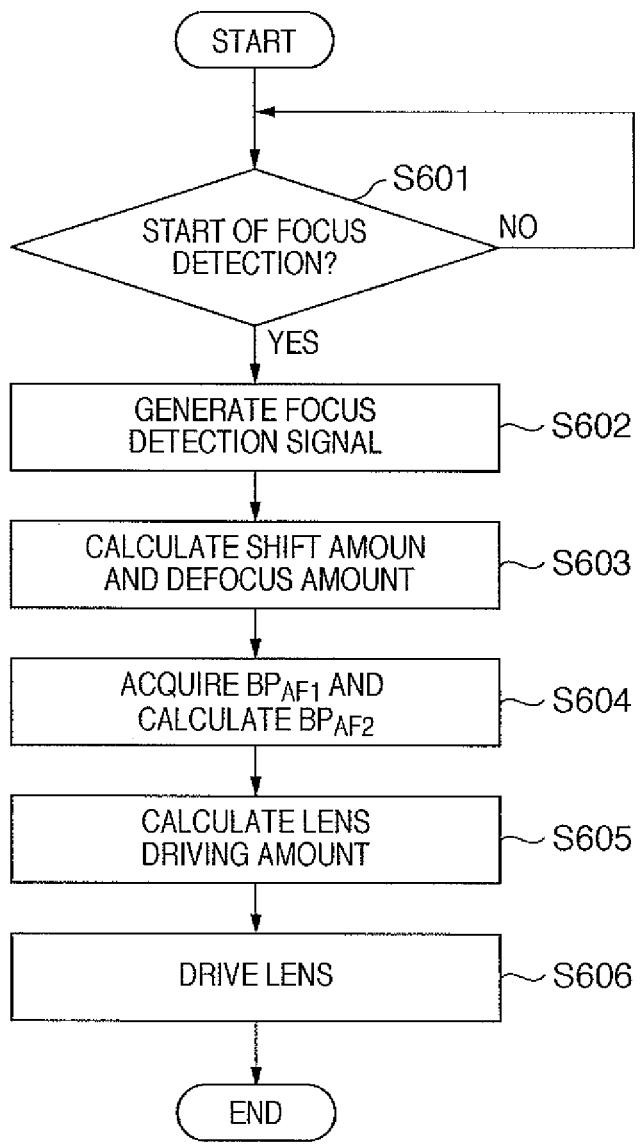
FIG. 14 is a flowchart showing an actual focus detection operation by the second focus detection unit in a system control unit.

FIG. 14 is a flowchart showing an actual focus detection operation by the second focus detection unit in the system control circuit 50. In the first embodiment, the second focus detection unit detects the focus in the electronic viewfinder mode in which the main mirror 130 and sub-mirror 131 retract from the optical path of a photographing light beam, the shutter 12 is opened, and image data obtained by the image sensor 14 are sequentially displayed.

In step S601, it is determined whether the user has turned on a focus detection start button such as SW1 in the electronic viewfinder mode. If the user has turned on the button, the process advances to step S602.

In step S602, the composition unit 902 and coupling unit 903 of the image processing circuit 20 generate a pair of focus detection signals from the sequentially readout image data. The image processing circuit 20 sends the focus detection signals to the AF unit 42, and the process advances to step S603. Since the second focus detection unit detects the focus during the electronic viewfinder mode in the embodiment, the focus detection pixels 901a and 901b are arranged discretely in correspondence with thinning readout during the electronic viewfinder mode.

In step S603, the AF unit 42 calculates the shift amount between the paired focus detection signals by well-known correlation calculation or the like, and converts the shift amount into a defocus amount.

In step S604, $BP_{AF1}$ described with reference to FIGS. 6A, 6B, and 13 is acquired from the nonvolatile memory 348 of the photographing lens 300 via the interfaces 38 and 338 and the connectors 122 and 322. The correction value $BP_{AF2}$ for focus detection by the second focus detection unit is calculated according to equation (1).

In step S605, the lens driving amount of the photographing lens 300 is calculated based on the defocus amount calculated in step S603 and the correction value $BP_{AF2}$ for focus detection calculated in step S604.

In step S606, the lens driving amount is sent to the focus control unit 342 of the photographing lens 300 via the interfaces 38 and 338 and the connectors 122 and 322, adjusting the focus of the lens 311.

By this operation, the second focus detection unit detects the focus of the photographing lens 300. After step S606, for example, the focusing state is determined to detect the focus or notify an out-of-focus state, a description of which will be omitted.

As described above, according to the first embodiment, both the first and second focus detection units can execute high-precision focus detection. As a concrete example, there is a camera system in which the camera 100 includes only the first focus detection unit and the photographing lens 300 holds a correction value for focus detection in correspondence with the first focus detection unit. Assume that a camera configured by adding the function of the second focus detection unit to the camera 100 is released later. In this case, the embodiment is applied to especially an interchangeable photographing lens 300 released in the past, achieving high-precision focus detection even by the second focus detection unit. Also, a photographing lens 300 to be released in the future can cope with high-precision focus detection without newly expanding the system.

In the first embodiment, focus detection regions by the first and second focus detection units substantially match each other. The second focus detection unit can detect the focus at high precision by only substituting a correction value for focus detection shown in FIGS. 6A to 6C into equation (1). However, when the focus detection region by the second focus detection unit is set wider, a representative image height X of the focus detection region by the second focus detection unit is obtained. Then, correction values for focus detection by the first focus detection unit shown in FIGS. 6A to 6C are defined as those at an image height 0 at the center and an image height H at the periphery in the photographing frame. A correction value for focus detection at the image height X is calculated by interpolation from the correction values for focus detection at the image heights 0 and H. The calculated value is substituted into equation (1). Consequently, high-precision focus detection can be implemented even if focus detection regions by the first and second focus detection units do not coincide with each other.

In the first embodiment, the camera 100 includes both the first and second focus detection units. However, the present invention is also applicable to a camera system in which the camera 100 includes only the second focus detection unit and the photographing lens copes with the first focus detection unit.

(Second Embodiment)

The second embodiment is a modification to the first embodiment. Processing when the F-number of a photographing lens 300 changes will be explained.

The first focus detection unit suffices to detect the focus only when a stop 312 of the photographing lens 300 is set to a minimum F-number. However, the second focus detection unit cannot detect the focus at a minimum F-number depending on object brightness because it operates in the electronic viewfinder mode. The second embodiment will describe an example of performing high-precision focus detection by the second focus detection unit when the F-number of the photographing lens 300 changes.

Figure 15:
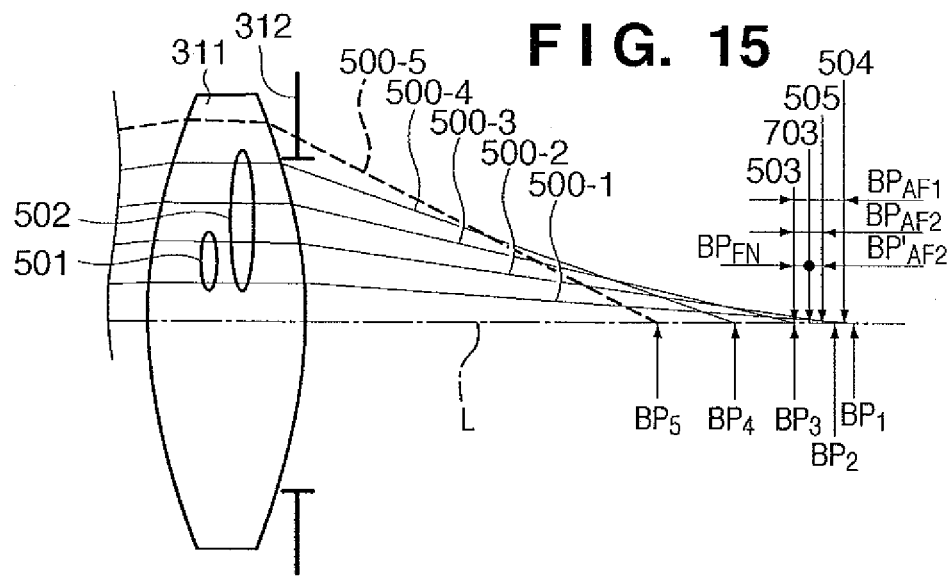
FIG. 15 is a schematic view showing aberration of a lens in the second embodiment.

FIG. 15 corresponds to FIG. 13 in the first embodiment, and is a schematic view showing aberration of a lens 311. Referring to FIG. 15, the stop 312 is narrowed down more than that in FIG. 13. Thus, an outermost light beam 500-5 is eclipsed as indicated by a dotted line in FIG. 15. As a result, the optimum image plane position of a photographing light beam moves from 503 to 703. However, an exit pupil 501 of the first focus detection unit and an exit pupil 502 of the second focus detection unit are free from eclipse, so corresponding imaging positions 504 and 505 do not change. From this, an optimum image plane position difference $BP_{FN1}$ depending on the F-number of a known photographing light beam is stored in advance in a nonvolatile memory 348 of the photographing lens 300. As is apparent from FIG. 15, when the F-number changes, the first focus detection unit can use $BP_{FN1}$ to detect the focus at high precision. Correction of the optimum image plane position by the first focus detection unit upon a change of the F-number is generally known and is clarified in FIG. 15, so a detailed description thereof will be omitted.

Based on this idea, as is apparent from FIG. 15, a correction value $BP'_{AF2}$ for focus detection by the second focus detection unit can be given by $$BP'_{AF2} = BP_{AF2} - BP_{FN1} \qquad (2)$$

As represented by equation (1), $BP_{AF2}$ is calculated based on the correction value $BP_{AF1}$ for focus detection by the first focus detection unit. Also in the second embodiment, the second focus detection unit can implement high-precision focus detection by applying the correction value $BP_{AF1}$ for focus detection.

(Third Embodiment)

In the third embodiment, a stop 312 is narrowed down more than that in the second embodiment.

Figure 16A:
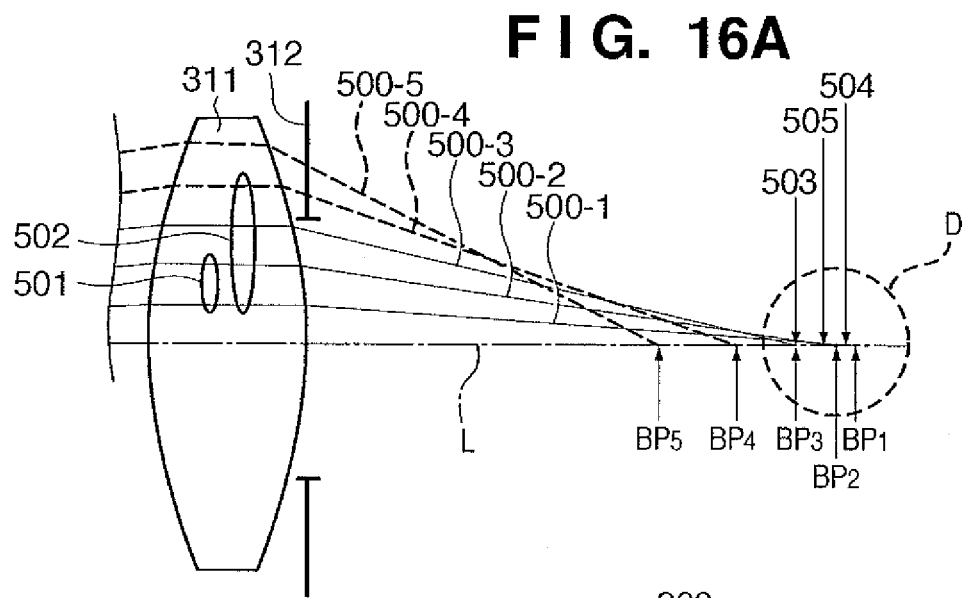
FIG. 16A is a schematic view showing aberration of a lens in the third embodiment.

FIG. 16A corresponds to FIG. 15 in the second embodiment, and is a schematic view showing aberration of a lens 311. In the third embodiment, the stop 312 eclipses not only an outermost light beam 500-5 but also a light beam 500-4 passing through an exit pupil 502, as indicated by a dotted line in FIG. 16A. A light beam concerning the second focus detection unit is eclipsed in addition to a photographing light beam, changing the optimum image plane position.

Figure 16B:
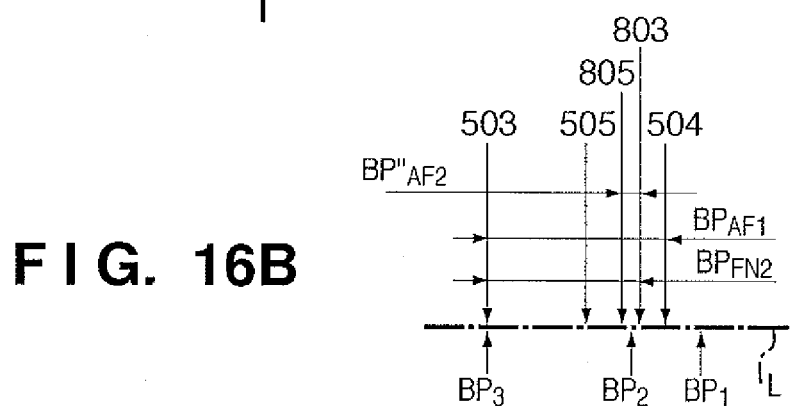
FIG. 16B is a schematic view showing aberration of the lens in the third embodiment.

FIG. 16B is an enlarged view of a portion D represented by a dotted circle in FIG. 16A. The optimum image plane position will be explained with reference to the enlarged view of FIG. 16B because FIG. 16A is complicated.

In FIG. 16B, the optimum image plane position of a photographing light beam changes from the position of the arrow 503 in the first embodiment to that of an arrow 803. Then, the optimum image plane position of a photographing light beam is corrected satisfactorily using an optimum image plane position difference $BP_{FN2}$ depending on the F-number of a known photographing light beam.

Since an exit pupil 501 of the first focus detection unit is free from eclipse, its optimum image plane position does not change from 504. An exit pupil 502 of the second focus detection unit is eclipsed, and its optimum image plane position changes to 805. As a result, the optimum image plane positions 504 and 805 of the first and second focus detection units are opposite in direction from the optimum image plane position 803 of a photographing light beam, and require different magnification coefficients, unlike the first and second embodiments. For this reason, a correction value $BP''_{AF2}$ for focus detection by the second focus detection unit is given using a magnification coefficient K" different from that in the first embodiment:

$$BP''_{AF2}=(BP_{AF1}-BP_{FN2})\times K'' \quad (3)$$

The magnification coefficient K" is prepared for each value in the focus detection correction value tables shown in FIGS. 6A and 6B. Accordingly, the second focus detection unit can achieve high-precision focus detection regardless of the zoom position and focus position of the photographing lens 300. Similar to the first embodiment, the magnification coefficient K" may be fixed.

In this example, only spherical aberration of the lens 311 has been explained schematically. In practice, the amount and direction of spherical aberration are more complicated. The magnitude and direction of the correction value $BP''_{AF2}$ for focus detection may differ from those in FIGS. 16A and 16B. The magnitude and direction of the correction value $BP''_{AF2}$ for focus detection are finally calculated by optical simulation software, measurement in the process, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-280275, filed Oct. 30, 2008, which is hereby incorporated by reference herein in its entirety.

The invention claimed is:

1. A camera comprising:
 first focus detection means for detecting a focus of a photographing lens, wherein the first focus detection means includes first pupil-dividing means for guiding light beams having passed through different pupil regions of the photographing lens, and wherein the first focus detection means detects the focus of the photographing lens by using light beams guided by the first pupil-dividing means; and
 second focus detection means for detecting a focus of the photographing lens on an image plane where an image is recorded, wherein the second focus detection means includes second pupil-dividing means, and wherein the second focus detection means detects the focus of the photographing lens by using light beams guided by the second pupil-dividing means,
 wherein the first focus detection means detects the focus of the photographing lens using a correction value stored in the photographing lens, and
 wherein the second focus detection means detects the focus of the photographing lens using the correction value.

2. A camera system comprising:
 a camera according to claim 1; and
 a photographing lens that stores the correction value.

3. A camera comprising:
 a first focus detection unit for performing a first focus detection, wherein the first focus detection unit includes a first pupil-dividing unit for guiding light beams having passed through different pupil regions of a photographing lens, and wherein the first focus detection unit detects a focus of the photographing lens by using light beams guided by the first pupil-dividing unit; and
 a second focus detection unit for performing a second focus detection, wherein the second focus detection unit includes a second pupil-dividing unit, and wherein the second focus detection unit detects a focus of the photographing lens on an image plane where an image is recorded by using light beams guided by the second pupil-dividing unit,
 wherein the first focus detection unit detects the focus of the photographing lens using a correction value stored in the photographing lens, and
 wherein the second focus detection unit detects the focus of the photographing lens using the correction value which is used in the first focus detection.

4. The camera according to claim 3, wherein the second pupil-dividing unit performs a pupil division by shifting an opening of a pixel relative to a center of a micro lens corresponding to the pixel.

5. The camera according to claim 4, wherein the second focus detection unit includes a plurality of pixels and a plurality of micro lenses corresponding to each pixel, and
 wherein the second focus detection unit calculates correlation of images from pixel groups in which the openings of the pixels are shifted to different directions relative to the center of respective micro lenses and detects a focus state.

6. The camera according to claim 3, wherein the correction value corrects a shift of an image forming position caused by aberration.

7. The camera according to claim 3, wherein a correction value for focus detection at an image height of X is determined according to interpolation calculation between a correction value at a center of the image plane and a correction value at an image height of H.

8. The camera according to claim 3, wherein the correction value is determined in accordance with an F number.

9. The camera according to claim 3, wherein the correction value is determined in accordance with a magnification coefficient.

10. The camera according to claim 3, wherein a determination of the correction value by the first focus detection unit is the same result as a determination of the correction value by the second focus detection unit.

11. The camera according to claim 3, wherein the first pupil-dividing unit includes a diaphragm having a pair of openings.

12. A camera system comprising:
a camera defined in claim 3; and
a photographing lens that stores the correction value.

* * * * *